United States Patent [19]

Louis

[11] 3,969,896
[45] July 20, 1976

[54] TRANSMISSION RATIO CONTROL SYSTEM

[75] Inventor: Joseph E. Louis, Ames, Iowa

[73] Assignee: Sundstrand Corporation, Rockford, Ill.

[22] Filed: May 8, 1975

[21] Appl. No.: 575,450

[52] U.S. Cl. .................................. 60/431; 60/449; 60/451; 60/452
[51] Int. Cl.² .................... F15B 15/18; F16H 39/46
[58] Field of Search ............ 60/431, 433, 434, 445, 60/448, 449, 451, 452; 74/868; 417/217

[56] References Cited
UNITED STATES PATENTS

| | | | |
|---|---|---|---|
| 2,976,685 | 3/1961 | Thoma et al. | 60/431 |
| 3,284,999 | 11/1966 | Lease | 60/431 |
| 3,371,479 | 3/1968 | Yapp et al. | 60/431 |
| 3,583,154 | 6/1971 | Utter | 60/431 |
| 3,855,793 | 12/1974 | Pollman et al. | 60/445 X |

Primary Examiner—Edgar W. Geoghegan
Attorney, Agent, or Firm—Wegner, Stellman, McCord, Wiles & Wood

[57] ABSTRACT

A transmission ratio control system including an engine having fuel supply means for controlling engine power, a hydrostatic transmission driven by the engine including means for varying transmission ratio, a ratio control valve for controlling the ratio varying means, means for applying a bias to the ratio control valve proportional to engine speed, and means responsive to system pressure in the hydrostatic transmission for applying an opposing bias to the ratio control valve proportional to engine torque. In operation, the fuel supply means calls for a predetermined amount of power to be delivered by the engine and the system pressure in the hydrostatic transmission is utilized and as modified by the transmission ratio to provide an indication of engine torque, with the ratio control valve being responsive to the engine speed and the engine torque to vary the transmission ratio to obtain a desired power/speed curve for operation of the engine. The system also includes a brake valve alternatively operable to deliver a signal simulating an engine torque level to correspond to the desired engine speed.

15 Claims, 4 Drawing Figures

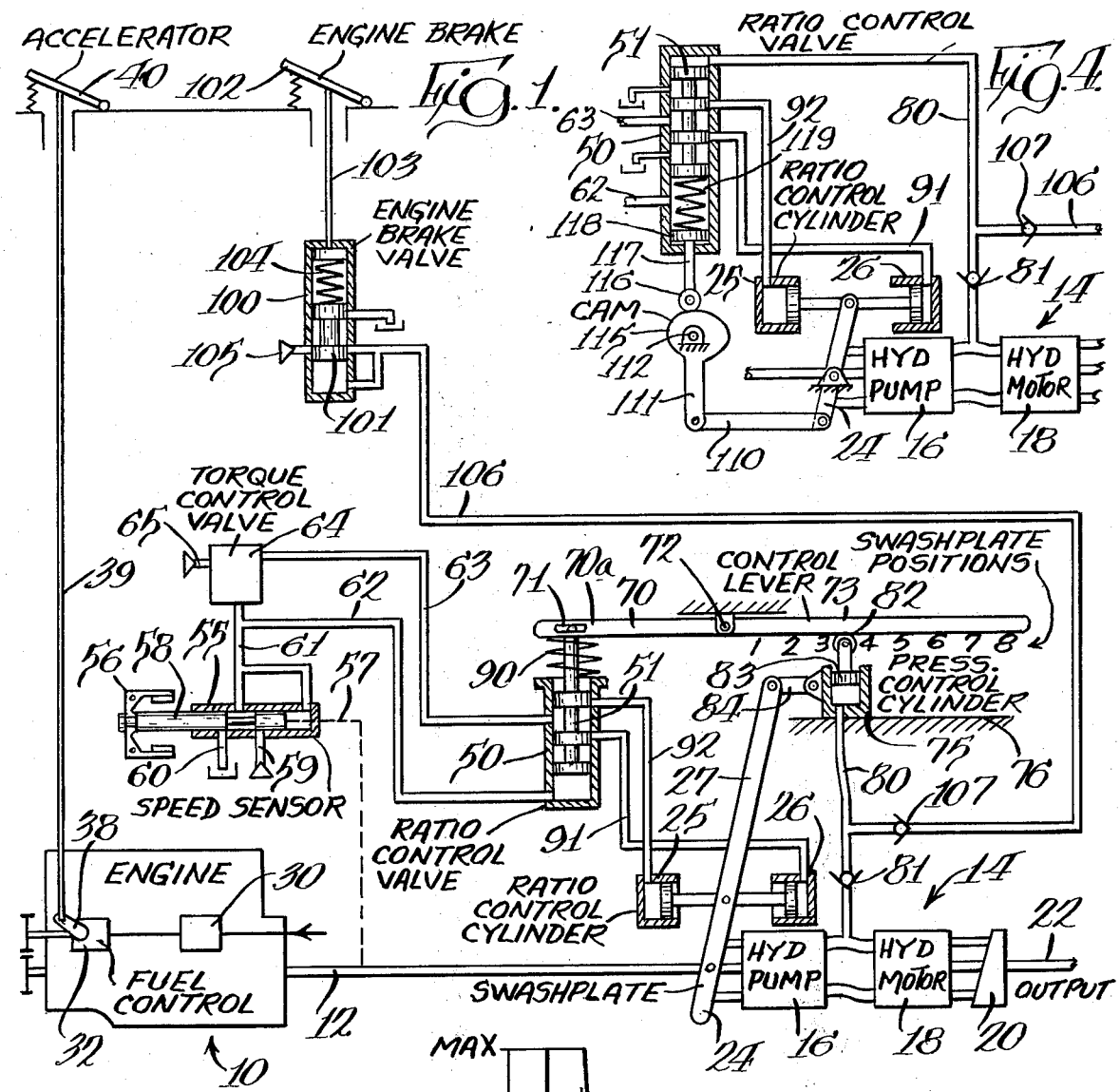
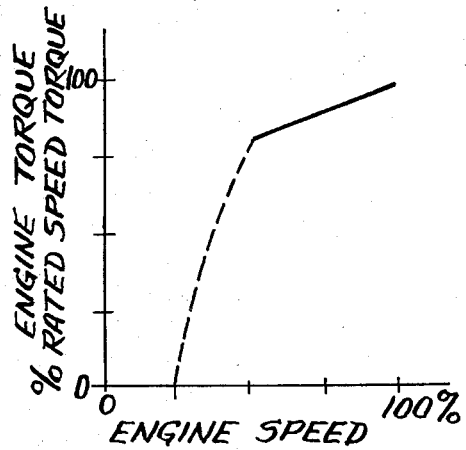
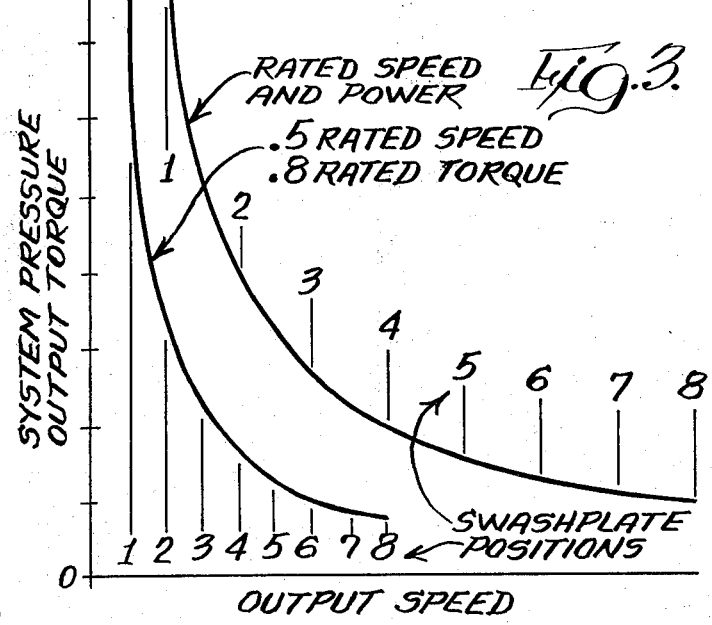

TRANSMISSION RATIO CONTROL SYSTEM

BACKGROUND OF THE INVENTION

The present invention relates to a transmission ratio control system in which engine power is established by a manually controllable fuel supply means and a hydrostatic transmission ratio is varied by comparing engine speed with engine torque as derived from sensing system pressure in the hydrostatic transmission to provide a predetermined engine speed in which minimum fuel is consumed.

An infinitely variable ratio power transmission device, such as a hydrostatic or hydromechanical transmission, is capable of adapting variable input speeds to variable output speeds in any combination over the operating range of the transmission and engine. Once such transmissions are installed in conjunction with a variable speed engine in a mobile vehicle, such as a truck or tractor, it is often desirable to operate the engine at various regulated speeds which are dependent upon power demand in order to obtain certain operating characteristics, such as maximum fuel economy, maximum power or maximum engine life. Engine speed can be controlled by a ratio control valve responsive to engine speed and engine torque in a manner to vary the transmission ratio to control the engine speed for minimum fuel consumption for a predetermined power requirement.

Generally, infinitely variable hydrostatic and hydromechanical transmissions require a mechanical input signal to set the desired input or engine speed. This signal is generally coordinated with a signal to the engine fuel control so that the engine will be operated at the most economical power/speed combination. The correct relationship is difficult to achieve and is subject to misadjustment with mechanical linkage. Mechanical linkage must be designed for each style of vehicle.

In the prior patent, Nyman, U.S. Pat. No. 3,733,931 assigned to the assignee of this application, a hydrostatic transmission ratio is controlled in a hydromechanical drive by a ratio control valve which is responsive to an engine speed signal and a mechanically applied horsepower signal. In U.S. Pat. No. 3,583,154, a hydrostatic transmission ratio is controlled by a ratio control valve which is responsive to an engine speed signal and responsive to a mechanically applied torque signal and, at a higher range of throttle settings, the ratio control valve is responsive to compressor discharge pressure which is proportional to the speed thereof.

In the prior application of Pollman et al., Ser. No. 352,660, filed Apr. 19, 1973, now U.S. Pat. No. 3,855,793, granted Dec. 24, 1974, and assigned to the assignee of this application, a hydrostatic transmission ratio is controlled by a ratio control valve which is responsive to an engine speed signal and a fluid signal representing horsepower as determined by a fuel rail signal.

The instant application includes a proportional linkage structure wherein system pressure is applied to a movable member at a variable location, depending upon output speed of the hydrostatic transmission. Proportional linkages used in control of transmissions are shown in the U.S. Pat. Nos. to Kacer 1,981,805, Thoma 2,976,685 and Molly 3,647,322. The proportional linkages in these patents do not include the provision of modifying the application of a force resulting from system pressure of a transmission which represents output torque with output speed and, specifically, by modification from the position of the swashplate of a variable displacement element of the transmission.

SUMMARY OF THE INVENTION

It is a general object of the present invention to provide a new and improved transmission ratio control system utilizing an engine torque signal derived from system pressure of the hydrostatic transmission for application to a ratio control valve in opposition to a signal representing engine speed in order to control the transmission and have the engine operate on a desired power/speed curve.

A more specific object of the invention is to provide a new and improved transmission ratio control system for causing the engine to operate on the desired power/speed curve, which eliminates mechanical linkages to the transmission for ratio control and which provides for the coordination of a signal from the torque within the hydrostatic transmission with a signal representing engine speed and with conversion of the output torque which is sensed within the transmission to a signal representing engine torque.

A primary feature of the invention disclosed herein is to eliminate all mechanical linkages to the transmission for ratio control and eliminate the need for any external relationships to exist or be adjusted in order to operate the engine on the desired power/speed curve. In operating on the desired power/speed curve, there is a specific speed for each engine torque to provide maximum fuel economy and engine performance. The invention disclosed herein causes a variation in the transmission ratio in order to bring engine speed to a value with respect to a certain engine torque as established by a fuel control in order to obtain the desired fuel economy and engine performance.

More specifically, a ratio control valve has a signal applied thereto responsive to the speed of the engine and an opposing signal through a linkage network derived from system pressure of the hydrostatic transmission. The application of system pressure to the linkage network is varied responsive to the position of the swashplate of the variable transmission unit of the hydrostatic transmission, whereby the system pressure which represents output torque of the transmission is modified to, in effect, provide an indication of engine torque. Positioning of the ratio control valve results in control of the variable displacement unit to bring the engine speed to a particular value for a particular engine torque. Alternatively to the mechanical connection to the swashplate of the variable displacement unit for giving an indication of output speed of the transmission, there could be a hydraulic signal from an output speed sensor which could be used to modify the application of system pressure to the linkage network.

A preferred embodiment utilizes a cam positioned by position of said swashplate to act on a ratio control valve in opposition to system pressure of the hydrostatic transmission whereby the resulting effect on the ratio control valve is representative of engine torque and the ratio control valve compares said resulting effect to a signal representing engine speed.

Additionally, the transmission ratio control system disclosed herein has provision for engine braking whereby a signal provided by operation of a brake member may be applied to the linkage network in place of the system pressure signal from the hydrostatic transmission to, in effect, simulate the engine torque level that corresponds to the desired engine speed whereby the ratio control valve will change the transmission ratio until the engine reaches the desired speed.

BRIEF DESCRIPTION OF THE DRAWINGS

FIG. 1 is a diagrammatic illustration of a transmission ratio control system embodying the principles of the present invention in association with a diesel engine;

FIG. 2 is a graph including a curve illustrating engine torque compared to engine speed;

FIG. 3 is a graph comparing system pressure-output torque to output speed of the transmission with two curves illustrating the relation therebetween for a plurality of swashplate positions for the variable displacement unit and different power/speed combinations; and FIG. 4 is a fragmentary diagrammatic illustration of a preferred embodiment of the system.

DETAILED DESCRIPTION OF THE EMBODIMENTS

Referring to FIG. 1, an engine, indicated generally at 10, has a drive shaft 12 appropriately connected to drive an input shaft for a hydrostatic transmission, indicated generally at 14. As illustrated diagrammatically, the hydrostatic transmission 14 includes a variable displacement hydraulic pump 16 connected in closed hydraulic circuit with a fixed displacement hydraulic motor 18. Preferably, the pump and motor are axial piston devices of conventional construction in which axially disposed cylinders arranged in an annular series concentric around the axis of rotation receive reciprocal pistons controlled by angularly disposed cam surfaces. As illustrated, the hydraulic motor 18 includes a fixed cam or swashplate 20, and the motor drives an output shaft 22. The pump 16 includes a variable angle cam or swashplate 24, which tends to seek a minimum pressure position as described in the aforementioned U.S. Pat. No. 3,733,931. The swashplate is controlled by a pair of ratio control cylinders 25 and 26, with admission of control fluid to one or the other thereof varying and setting the angle of the swashplate 24 through connection to an arm 27 and thereby vary the displacement of the pump 16 to vary the transmission ratio. As utilized herein, the term "ratio" is used to mean the ratio of input speed to output speed. Thus, the term "increase transmission ratio" means to increase input speed relative to output speed while the term "decrease transmission ratio," means to decrease input speed relative to output speed.

The engine 10, illustrated diagrammatically in FIG. 1, is representative of a commercial engine in which fuel is supplied through a fuel filter 30 to a fuel unit 32. The amount of fuel delivered to the engine, and thus setting the torque of the engine, is controlled by a throttle mechanism including a lever 38 controlled by a link 39 which is, in turn, operated by an accelerator pedal 40. The graph of FIG. 2 shows a desired power/speed curve for the engine in order to operate at a particular speed for each value of torque to obtain fuel economy and best engine performance. Maximum economy is of importance in only the upper half of the engine speed range, as shown in full line in the curve of FIG. 2. Maximum economy at 50% rated engine speed is from 70–90% of rated speed/torque for most engines including gasoline and diesel. It is, therefore, the objective of the system to operate the engine at 80% rated speed/torque at 50% rated engine speed on up to maximum engine torque at rated speed.

For the system illustrated diagrammatically in FIG. 1, the output torque and, thus, system pressure of the hydrostatic transmission 14, vary with output speed of the transmission. Two curves are illustrated, with the righthand curve being that for rated speed and power and with the second curve showing the relation between system pressure and output speed for 50% rated speed and 80% rated torque. Each of these curves has swashplate positions, indicated along the length thereof, corresponding to the swashplate positions associated with the proportional linkage illustrated in FIG. 1 and more particularly described hereinafter.

A ratio control valve 50 has a valve member 51 urged upwardly, as shown in FIG. 1, by a bias signal proportional to engine speed. This signal is derived from a speed sensor valve 55 having rotary flyweights 56 responsive to the speed of the drive shaft 12 through a connection, indicated diagrammatically at 57, for positioning of a valve stem 58 whereby the communication of a supply port 59 for control fluid to a tank port 60 is controlled to provide a pressure signal to a line 61 which is applied to the valve stem 58 in opposition to the movement thereof caused by the governor action of the flyweights 56. The line 61 also connects to a line 62 leading to the underside of the valve member 51 of the ratio control valve.

Control fluid is supplied to the ratio control valve through a line 63 connected to a torque control valve 64 which has a supply port 65 for control fluid.

Means are provided for applying an opposing bias to the ratio control valve proportional to engine torque and which is responsive to the system pressure of the hydrostatic transmission. This means includes a member in the form of a pivoted control lever 70 having one end 70a connected by a pin and slot connection 71 to the valve member 51 of the ratio control valve and having an intermediate fixed pivot point 72. The other end 73 of the lever 70 is acted upon by a pressure control cylinder 75 movably mounted on a fixed surface 76. The pressure control cylinder 75 is connected into the hydraulic circuit of the hydrostatic transmission 14 through a flexible line 80 having a one-way check valve 81 whereby system pressure in the hydraulic transmission is directed to the pressure control cylinder to act against a movable pressure-responsive element 83 in the form of a piston having a roller 82 engaging the lever end 73.

The pressure control cylinder is movable along the fixed surface 76 by a linkage including a link 27 connected to the swashplate 24 and an additional link 84, pivoted at both ends, connects the link 27 to the cylinder. With this construction, the cylinder 75 is positioned along the lever end 73 in one of the positions identified as 1–8 and corresponding to the swashplate positions 1–8 shown for the two curves in the graph of FIG. 3. There can be infinite positions between positions 1–8; however, these positions are identified for comparison purposes.

A spring 90 surrounds an end of the valve member 51 and acts between the casing of the ratio control valve 50 and the lever end 70 to urge the lever in a direction against the pressure-responsive element roller 82.

With the system as now described in FIG. 1, the output torque within the transmission is sensed through line 80. This torque is a function of engine torque and in order to determine engine torque the system pressure signal is modified with output speed derived from the position of the swashplate or cam 24. Alternatively, a hydraulic signal from output speed sensor could be used in place of the links 27 and 84 for positioning the pressure control cylinder 75.

With the positioning of the pressure control cylinder, a force is applied to the lever end 70a which is a function of engine torque and with this force minus the force of the spring 90 being applied to the valve member 51 of the ratio control valve in opposition to the bias from the speed sensor valve 55. The two are equal for a steady state condition. If this condition does not exist, the transmission ratio will be changed by adjustment of the swashplate position until this condition does exist. Assuming the ratio control valve member 51 is moved downwardly, control fluid is delivered through a line 91 to the ratio control cylinder 26 to decrease the transmission ratio, with resulting increase in engine speed, until the ratio control valve again reaches a steady state condition. Conversely, if the ratio control valve member 51 is shifted upwardly, control fluid is delivered through a line 92 to the ratio control cylinder 25 to increase the stroke of the hydraulic pump 16 with resulting increase of the transmission ratio and decrease in engine speed. At engine speeds of less than 50% of rated speed, the ratio control will attempt to increase the stroke of the hydraulic pump 16, but this action is limited by the torque control valve 64 in a known manner. The torque control valve is basically a relief valve with a variable setting depending upon speed as sensed by the speed signal in line 61.

A start torque control (not shown) is employed for lower power conditions.

The transmission ratio control system also has provision for engine braking whereby an engine brake valve 100 has valve member 101 operable by a brake pedal 102 connected to a plunger 103 which acts on the valve member through a spring 104 to control the supply of control fluid from a supply port 105 to a line 106 which connects into the flexible line 80 through a one-way check valve 107. The engine braking circuit functions to drive the engine up in speed with the inertia of the vehicle. A pressure signal is delivered through line 106 to the pressure control cylinder 75 which simulates the engine torque level that corresponds to the desired engine speed. The action through the lever 70 will adjust the ratio control valve to change the transmission ratio until the engine reaches the desired speed.

As stated previously, the output speed of the hydrostatic transmission may be determined by a speed sensor other than by signalling the position of the swashplate 24. Also, the position of the swashplate could be sensed electrically.

A preferred embodiment of the ratio control system is illustrated in FIG. 4, to the extent that it differs from the system disclosed in FIG. 1. The primary difference is in the mode of application of a signal to the ratio control valve 50 which is representative of engine torque.

The ratio control valve has the valve member 51 controlling the connection of a line 63 to the ratio control cylinders 25 and 26. An engine speed signal is applied to the lower end of the valve member 51 through the line 62.

The hydrostatic transmission system pressure existing in line 80 is directed to the upper end of the ratio control valve and acts against an area at the upper end of the valve member 51. The conversion of this pressure to a signal representing engine torque is derived through the action of a linkage connected to the swashplate 24. This linkage includes a link 110 pivotally connected to an arm 111 pivoted at 112 with the arm 111 having a cam 115 coacting with a cam follower roller 116. The cam 115 has a contoured surface resulting in variable positioning of the cam follower roller 116 dependent upon the position of the swashplate 24. The cam follower roller is carried on a stem 117 having a disc 118 within the ratio control valve for adjusting the compression of a spring 119 engaging against the underside of the valve member 51.

From the foregoing, it will be seen that increasing compression of the spring 119 will reduce the total effect of transmission system pressure on the valve member 51 in opposition to the engine speed signal derived from line 62. With minimum compression on the spring 119, there is an action similar to the positioning of the roller 82 at position 8 of the control lever 70 in the embodiment of FIG. 1. Maximum compression of the spring 119 results in the least positive signal from transmission system pressure and, thus, this corresponds to position 1 of the control lever 70 in the embodiment of FIG. 1.

I claim:
1. A drive, comprising,
   a. an engine having fuel supply means for controlling engine torque,
   b. a hydrostatic transmission driven by the engine including means for setting and varying the transmission ratio,
   c. a ratio control valve for controlling the ratio setting and varying means,
   d. means for applying a bias to the ratio control valve proportional to engine speed, and
   e. means responsive to the system pressure of said hydrostatic transmission for applying an opposing bias to the ratio control valve proportional to engine torque.
2. A drive as defined in claim 1, including means for applying an opposing bias to the ratio control valve alternative to the engine torque bias for braking.
3. A drive as defined in claim 1 wherein said last-mentioned means includes a member acting on said ratio control valve and means acting on said member in response to said system pressure to an extent determined by the transmission ratio set by said transmission ratio setting means.
4. A drive as defined in claim 3 wherein said member is a pivoted lever, and said last-mentioned means includes a system pressure responsive element engaging said lever, and means for positioning said element lengthwise of said lever dependent upon the set transmission ratio.
5. A drive, comprising,
   a. a hydrostatic transmission including first and second hydraulic units connected in closed hydraulic circuit,
   b. an input shaft driving the hydrostatic transmission,
   c. an output shaft driven by the hydrostatic transmission,
   d. an engine for driving the input shaft,
   e. fuel control means for establishing engine torque,
   f. means for setting and varying the displacement of one of the hydraulic units to establish the transmission ratio, g. a ratio control valve for controlling the displacement setting and varying means, h. means responsive to the speed of the engine for applying a bias to the ratio control valve proportional to engine speed, i. means positionable in response to system pressure in said closed hydraulic circuit for acting on said ratio control valve in opposition to the speed bias, and j. means responsive to the transmission ratio for modifying the action of said last-mentioned means.

6. A hydrostatic transmission, comprising, an input shaft, an output shaft, a first hydraulic unit connected to the input shaft, a second hydraulic unit connected to the output shaft, conduit means interconnecting the hydraulic units for delivering fluid under pressure from one to the other and returning fluid from the other to the one, an engine for driving the input shaft including fuel control means for controlling engine torque, fluid operable means for varying the displacement of one of the hydraulic units to vary the speed of the output shaft relative to the speed of the input shaft and the output torque, a ratio control valve, including a valve member for controlling flow of fluid relative to the displacement varying means, engine speed responsive means for applying a bias to the ratio control valve member, means responsive to system pressure of the hydraulic units for applying an opposing bias to said ratio control valve member which is indicative of engine torque whereby an imbalance in said bias and opposing bias results in shift of said ratio control valve member to operate the displacement varying means and vary the displacement of said one hydraulic unit to vary the speed of the output shaft and accordingly bring the speed of the input shaft and engine to a desired speed relative to engine torque.

7. A hydrostatic transmission as defined in claim 6 wherein said means for applying an opposing bias to the ratio control valve includes a movable member connected to the valve member and said movable member exerts a force which is the result of said system pressure and the displacement varying means.

8. A hydrostatic transmission as defined in claim 7 wherein said movable member is a lever, a control cylinder movable along the lever to a position determined by the displacement of said one hydraulic unit, and a control member in said control cylinder movable against said lever by said system pressure.

9. A hydrostatic transmission, comprising,
a. an input shaft,
b. an output shaft,
c. a first hydraulic unit connected to the input shaft,
d. a second hydraulic unit connected to the output shaft,
e. conduit means interconnecting the hydraulic units for delivering fluid under pressure from one to the other and returning fluid from the other to the one,
f. an engine for driving the input shaft including fuel control means for controlling engine torque,
g. fluid operable means for varying the displacement of one of the hydraulic units to vary the speed of the output shaft relative to the speed of the input shaft,
h. a ratio control valve, including
  h-1. a valve member for controlling flow of fluid relative to the displacement varying means,
i. a speed sensing valve, including
  i-1. an inlet communicating with a source of control fluid,
  i-2. an outlet for supplying fluid to the ratio control valve to apply a fluid bias thereto, and
  i-3. a valve member controlling communication between the inlet and outlet,
j. means for sensing engine speed and controlling the speed sensing valve, and
k. means responsive to the system pressure in said conduit means and providing a signal proportional to engine torque to said valve member in opposition to said fluid bias whereby said ratio control valve establishes a transmission ratio for controlling engine speed relative to engine torque.

10. A hydrostatic transmission as defined in claim 9 wherein said last-mentioned means includes a pivoted lever having one end connected to said valve member, a control cylinder having a control member engageable with said lever, said control member being urged toward said lever by system pressure and acting on said lever in opposition to said fluid bias, means mounting said control cylinder for movement lengthwise of said lever, and means positioning said control cylinder lengthwise of said lever at a position corresponding to the displacement of said one hydraulic unit.

11. A hydrostatic transmission as defined in claim 10 wherein engine braking is accomplished by means including an engine brake valve establishing a brake control pressure, and means for applying said brake control pressure to said control member in place of system pressure to have said lever and ratio control valve change the transmission ratio until the desired engine speed is reached.

12. A hydrostatic transmission as defined in claim 10 wherein said one hydraulic unit includes a movable swashplate and said means for positioning said control cylinder includes a linkage interconnecting said swashplate and said control cylinder.

13. A hydrostatic transmission, comprising, an input shaft, an output shaft, a first hydraulic unit connected to the input shaft, a second hydraulic unit connected to the output shaft, conduit means interconnecting the hydraulic units for delivering fluid under pressure from one to the other and returning fluid from the other to the one, an engine for driving the input shaft including fuel control means for controlling engine torque, fluid operable means for varying the displacement of one of the hydraulic units to vary the speed of the output shaft relative to the speed of the input shaft and the output torque, a ratio control valve, including a valve member for controlling flow of fluid relative to the displacement varying means, engine speed responsive means for applying a bias to the ratio control valve member, means for applying an opposing bias to said ratio control valve member which is indicative of engine torque including a signal derived from system pressure of the hydraulic units whereby an imbalance in said bias and opposing bias results in shift of said ratio control valve member to operate the displacement varying means and vary the displacement of said one hydraulic unit to vary the speed of the output shaft and accordingly bring the speed of the input shaft and engine to a desired speed relative to engine torque.

14. A transmission as defined in claim 13 wherein the signal derived from system pressure acts on the ratio control valve, spring means acting on the ratio control valve in opposition to said signal, and means responsive to the displacement of said one hydraulic unit to vary the spring force of the spring means.

15. A transmission as defined in claim 14 wherein said responsive means includes a movable cam which is operatively connected to a swashplate of said one hydraulic unit.

* * * * *